L. PICHOT, NEE DERENNE.
TRAP FOR FLIES AND THE LIKE.
APPLICATION FILED APR. 30, 1919.
1,312,573.
Patented Aug. 12, 1919.
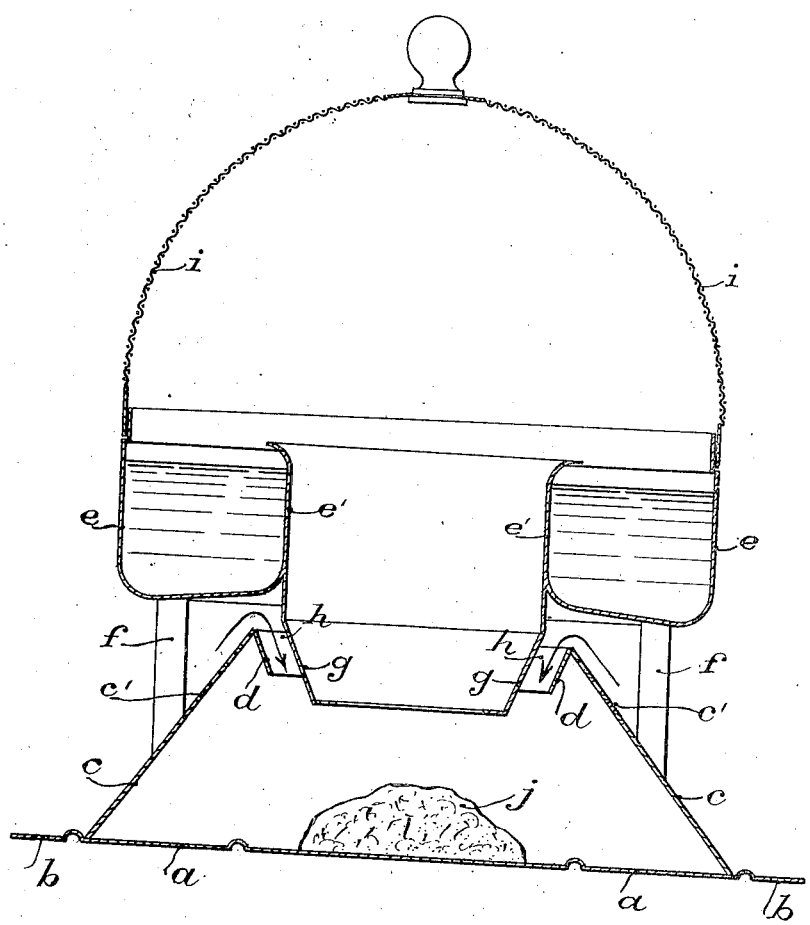
Inventor
Léontine Pichot (née Derenne)
by *[signature]*
her Attorney

UNITED STATES PATENT OFFICE.

LÉONTINE PICHOT, NÉE DERENNE, OF ANGERS, FRANCE.

TRAP FOR FLIES AND THE LIKE.

1,312,573.   Specification of Letters Patent.   Patented Aug. 12, 1919.

Application filed April 30, 1919.   Serial No. 293,751.

*To all whom it may concern:*

Be it known that I, LÉONTINE PICHOT, née DERENNE, citizen of the Republic of France, residing at Angers, France, have invented certain new and useful Improvements in Traps for Flies and the like, of which the following is a specification.

The subject of this invention is a trap for capturing and destroying flies and other winged insects.

The feature of the trap is that the fly can penetrate into the interior in order to eat the bait contained therein but can no longer escape therefrom, being attracted into a well lighted chamber situated above a basin filled with soapy water or other suitable liquid.

When the fly has penetrated into this chamber, it flies constantly in the upper portion without finding an outlet, and, finally, falls exhausted and becomes drowned in the liquid contained in the basin.

The invention is represented, by way of example on the accompanying drawing showing, in vertical section, the entire trap.

As may be seen from the drawing, the trap comprises a tray $a$ of thin metal, provided with eyes or ears $b$, enabling it to be suspended by small chains.

On this tray rests by its base, a truncated conical casing $c$ having at its upper portion a series of perforations $c^1$, formed around the entire periphery and terminated at its upper end by an annular flange $d$ in the form of an inverted truncated cone.

A metal basin $e$ rests, by feet $f$ on the casing $c$ and has a central aperture, of which the border $e^1$ provides, with the outer border, an annular space serving to contain soapy water or any other liquid.

The inner border is extended at its lower portion, by a partition $g$ in the shape of an inverted truncated cone which extends into the casing $c$ parallel with the annular flange, leaving between this annular flange $d$ and the partition $g$ a narrow annular space $h$.

The outer border of the basin $e$ has at its upper portion a shoulder on which fits a bell or dome $i$ of metal gauze.

The thus assembled trap is provided with a bait $j$ placed at the middle of the tray $a$.

The fly is attracted by the bait, the smell of which spreads to the outside through the apertures $c^1$ formed in the casing $c$.

The tray $a$ being covered by the casing $c$ and the basin $e$ by the dome $i$, the fly to reach the bait is obliged to ensnare itself in the truncated conical annular space $h$ which leads it to the bait. This track being situated beneath the basin filled with water is very poorly lighted. When the fly leaves the bait it is attracted by the light penetrating freely the dome $i$, past the metal gauze.

It projects itself into the upper portion of the dome and, not finding any outlet, it finishes by falling, exhausted, into the liquid contained in the basin where it becomes drowned.

The advantages of the thus constructed trap are obvious from the foregoing. Its disassembly for cleaning, and assembly are effected very easily and very rapidly. Its relatively large surface as compared with its small bulk enables the capture of a large number of flies without having to replace the liquid. Finally, it is absolutely certain in its action, the flies can no longer escape therefrom when once they have penetrated into the interior.

It should be understood that the details of construction, material and dimensions of this trap can be varied without affecting the principle of the invention. Thus, for example, metal and metal gauze can be replaced by glass, porcelain or earthenware and be ornamented to suit the place where the appliance is situated. Finally, the trap can be placed flat on a table or on any other article of furniture or suspended by small chains.

I claim—

A trap for flies or like insects, comprising a tray on which the bait is placed, a truncated conical casing resting by its base on the tray perforated at the upper portion and having an inverted truncated conical flange, a basin for containing soapy water or any other liquid, supported by feet on the casing, and having a central aperture extending by a truncated conical border into the casing and providing with the flange a narrow annular space for the entry of insects into the tray, and a dome fitting on the basin, freely lighted to attract flies after leaving the bait and forcing same by deprivation of any outlet to fall into the liquid contained in the basin.

In testimony whereof I have affixed my signature in presence of two witnesses.

LÉONTINE PICHOT, NÉE DERENNE.

Witnesses:
H. MILLET,
G. HIPPOLYTE.

Copies of this patent may be obtained for five cents each, by addressing the "Commissioner of Patents, Washington, D. C."